H. F. KRANTZ.
METER PANEL.
APPLICATION FILED DEC. 18, 1912.

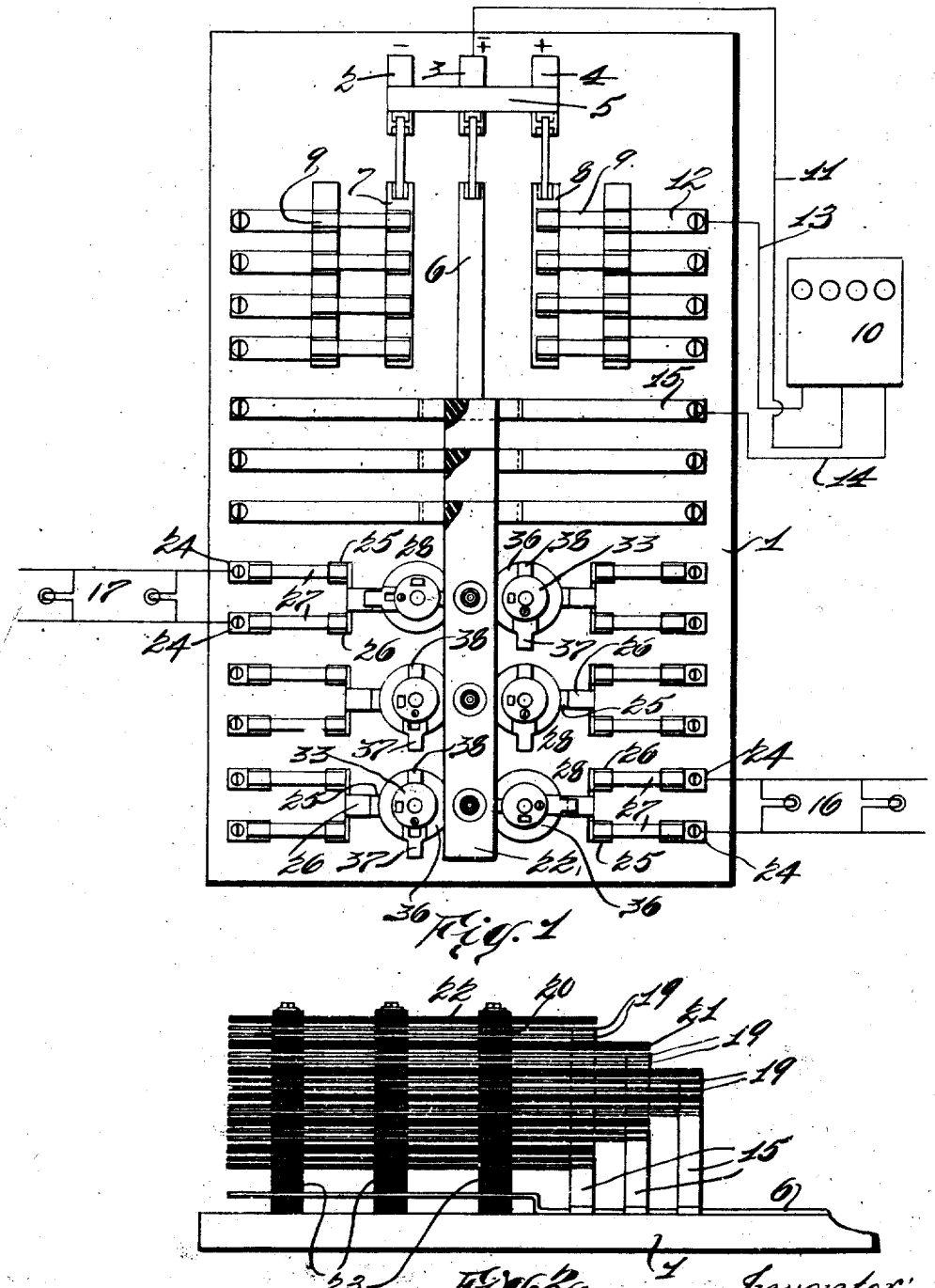

1,257,289.

Patented Feb. 19, 1918
3 SHEETS—SHEET 2.

Witnesses:
C. A. Jarvis
Fred F. Weiss

Inventor:
Hubert F. Krantz
by J. Warren Wright
attorney

H. F. KRANTZ.
METER PANEL.
APPLICATION FILED DEC. 18, 1912.

1,257,289.

Patented Feb. 19, 1918.
3 SHEETS—SHEET 3.

Witnesses.
C. A. Jarvis
Ind Sirius

Inventor
Hubert F. Krantz
by G. Warren Wright
attorney.

UNITED STATES PATENT OFFICE.

HUBERT F. KRANTZ, OF BROOKLYN, NEW YORK, ASSIGNOR TO KRANTZ MANUFACTURING COMPANY, INC., OF BROOKLYN, NEW YORK, A CORPORATION OF NEW YORK.

METER-PANEL.

1,257,289.  Specification of Letters Patent.  Patented Feb. 19, 1918.

Application filed December 18, 1912. Serial No. 737,373.

*To all whom it may concern:*

Be it known that I, HUBERT F. KRANTZ, a citizen of the United States, residing at Brooklyn, in the county of Kings, city and State of New York, have invented certain new and useful Improvements in Meter-Panels, of which the following is a clear, full, and exact description.

This invention relates to an improvement in meter panel boards; the object of this invention is to provide a meter board, each bus-bar of which can be connected to the same branch circuit, or in other words, my improved meter board is arranged so as to enable an operator to connect any one of a number of meters to the same branch circuit. The special features of the board are the arrangement of the bus-bars and switches adapted to close the circuit between the bars and the branch circuits. In my improved meter board each switch is designed to contact with any one of the bus-bars.

In the drawings, which form part of this specification:

Figure 1 is a top plan view of my improved meter board.

Fig. 2 is a fragmentary side elevation thereof, the switches being omitted.

Figure 3:
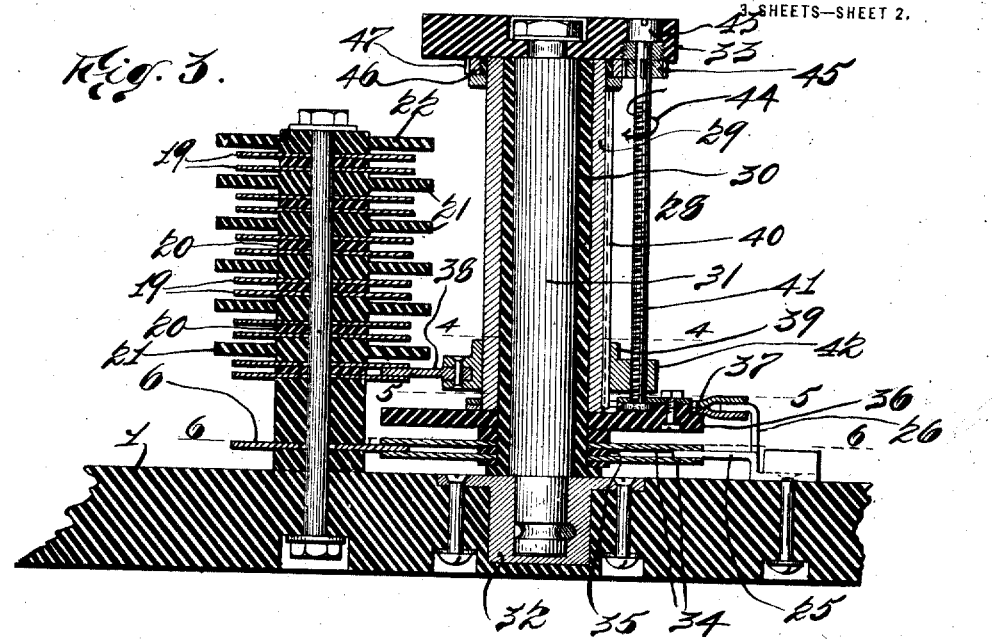
Fig. 3 is an enlarged detail sectional view of one of the switches, and also the bus-bars.
Figure 4:
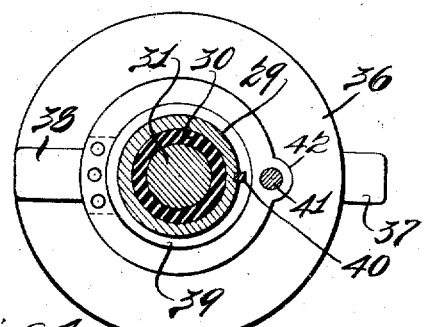
Fig. 4 is a sectional plan view thereof, the section being taken on a line 4—4 in Fig. 3.
Figure 5:
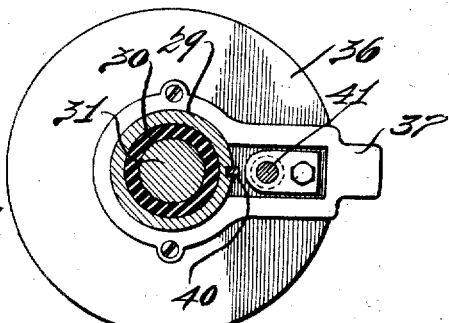
Fig. 5 is a similar view, the section being taken on a line 5—5 in Fig. 3.
Figure 6:
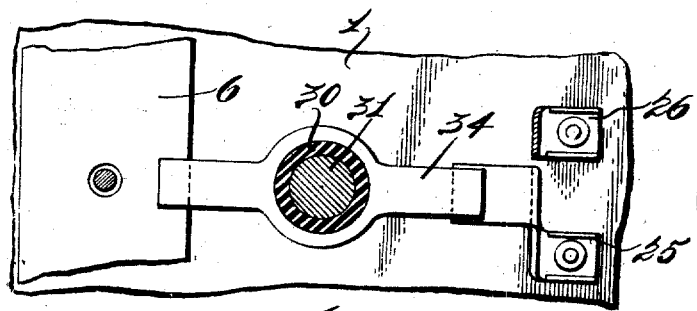
Fig. 6 is also a sectional plan view, the section being taken on a line 6—6 in Fig. 3.
Figure 7:
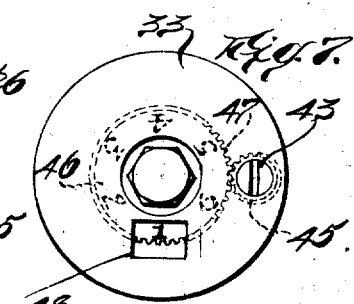
Fig. 7 is a top plan view of one of the switch handles.

The meter board herein illustrated comprises a base or back plate, 1, switch contacts 2, 3, and 4, and a switch 5, which connects the line with the neutral bus-bar 6 and fuse bars 7 and 8 for the fuses 9. A meter 10, one only being shown, is connected by a line wire 11 to the neutral bus-bar 6, and also to one of the fuse contacts 12 by a line wire 13; a line wire 14 connects the meter 10 with a bus-bar support 15. Two branch circuits are herein illustrated by 17 and 16.

The meter bus-bars which form part of the meter board construction are indicated by 19, the said bars being preferably arranged in pairs and separated by separators 20 of insulating material.

As can be seen in Fig. 3, the bus-bars are superposed, or located in different planes one above the other, and above the back plate, and in this instance the edges of the bars are in alinement. Each pair of meter bus-bars is separated from its adjacent pair by plates 21 of insulating material, the pile or group being covered by a cover plate 22, also of insulating material. The pile or group of meter bus bars is elevated somewhat above the neutral bus bar 6, which is also in alinement with the bars 19, and separated therefrom by separators 23 of insulating material. By reason of the provision of the plates 21 and cover plate 22, which extend considerably beyond the edges of the bars 19, the said bars 19 are protected, or more properly speaking the chance of accidental contact therewith is eliminated.

The branch circuits 16 and 17 are connected to fuse clip terminals 24, which in turn are connected to fuse clip terminals 25 and 26 by fuses 27. The inner or contact ends of the terminals 25 and 26 are located one above the other, the latter being in a plane above the former.

To control the circuit between the neutral and meter bus-bars and the branch line circuits I employ a special switch indicated generally by the reference numeral 28.

One of the special features of this board is that the neutral bus-bar 6 is common to all of the meter bus-bars 19, the circuit being completed through the body of the switch by means of a switch blade, which is movable longitudinally of the body of the switch, the neutral switch blade being rotatable only.

The object of this form of switch is to enable any one of the meter bus-bars to be connected to the branch circuit by merely shifting one of the switch blades. By means of this construction the scope of a meter board can be greatly increased, that is to say, a comparatively small compact board can take care of a great number of branch circuits. The cost of a board of this construction is far less than that of any ordinary meter board for the same number of circuits. The switch, which forms an important part of my invention, is of the rotatable variety, but of a special construction, one of the features being that the body of the switch is a conductor for completing the circuit. The switch above referred to and indicated by 28 consists of a rotatable body portion comprising a sleeve 29 of conducting material mounted upon or carried by a bushing 30 of insulating material, the said bushing being supported by a post 31 which is rotatably supported in a socket 32 carried by the back plate 1. The switch as a whole is rotated by hand, a hand wheel 33 being provided for the purpose.

Adjacent the lower end of the bushing 30, and upon the same, I locate the neutral switch blades 34, in this instance two, the said blades being kept apart by a separator 35 of insulating material. To cover the blades, 34, to prevent contact therewith from above, I provide a plate 36 of insulating material.

It will be obvious that the neutral blades 34 form a part of one side of the circuit. A part of the other side of the circuit consists of the sleeve 29, a contact or blade 37 secured thereto permanently, and a shiftable contact or blade 38 carried by the sleeve.

The permanently secured blade 37, in this instance, is secured to the plate 36 and electrically connected to the sleeve 29 in any manner, such as soldering or by being forced on to the sleeve. The shiftable blade 38 is carried by a block 39 of conducting material slidably mounted on the sleeve 29, a key 40 being provided to prevent the rotation of the block on the sleeve 29.

To slide the block 39 longitudinally of the sleeve 29 I provide a threaded spindle 41 which passes through the threaded lug 42 on the block 39. The lower end of the spindle is rotatably supported in the plate 36. The upper end of the spindle 41 is provided with a slotted head 43. The spindle can be rotated by means of a key or screw driver. To raise the block to cause the blade 38 to aline with any of the sets of meter bus-bars the spindle will be rotated as per the arrow 44. A reverse movement will lower the block. The block will be moved while the switch is in the off position.

To select the set of bus-bars to be thrown in I provide an indicating device which acts in conjunction with the spindle 41, the said device comprising a pinion 45 secured to the spindle 41 and a plate 46 loosely and rotatably mounted upon the sleeve 29. The plate 46 is provided with teeth 47 which mesh with the teeth of the pinion 45; the plate 46 carries in this instance numerals which appear to view through an opening 48 in the hand wheel or handle 33. Each numeral represents a set of bus-bars 19. The movement necessary to cause the block to travel from one set of bus-bars to another rotates the plate 46 sufficiently to cause the proper numeral to appear at the opening 48.

By means of the above described switch I am able to throw any set of meter bus-bars in circuit with the branch circuit controlled by the switch. As there are a number of such switches any one set of meter bus-bars can be thrown in circuit with a plurality of branch circuits by causing the movable blade 38 upon the switches to contact with the desired set of meter bus-bars.

Figure 8:
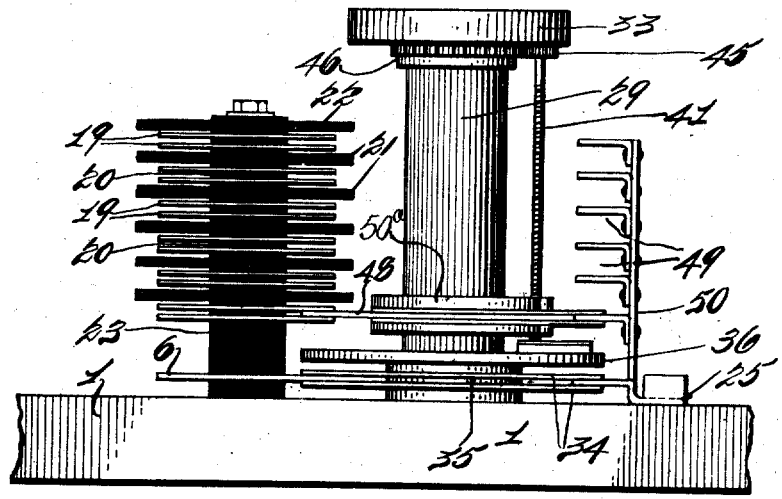
Fig. 8 is a detail end elevation of the bus-bars and a side elevation of a modified form of switch.

Fig. 8 illustrates another form of switch and also another arrangement of contacts which co-act therewith. In this instance the movable blade 48 closes the circuit directly from the bus-bars to the contacts 49. The blade 48 is carried by a slidable block 50$^a$. In other respects the switch is the same as the switch shown in Fig. 3.

In this form there is a contact 49 for every set of bus-bars, the said contact being carried by a post 50.

Figure 9:
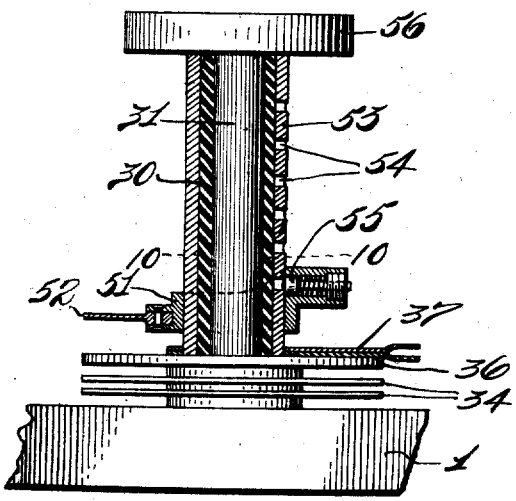
Fig. 9 is a sectional view of still another form of switch.
Figure 10:
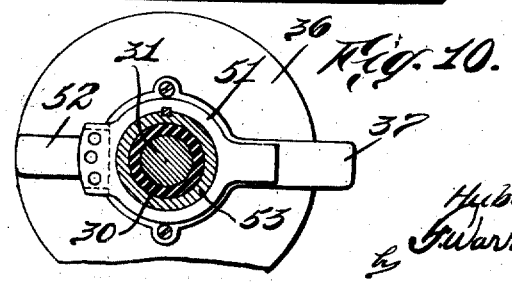
Fig. 10 is a sectional plan view, the section being taken on a line 10—10 in Fig. 9.

Fig. 9 illustrates another form of switch, and refers particularly to the shiftable block 51 carrying the blade 52. In this instance the sleeve 53 is provided with openings 54.

To hold the block 51 in an adjusted position, I provide a spring pressed latch 55 which snaps into the openings 54. In this last named switch the hand wheel 56 will be plain and has no indicator opening. The block 51 will be shifted up and down by hand.

As many changes could be made in this construction without departing from the scope of the invention as defined in the following claims, it is intended that all matter contained in the above description or shown in the accompanying drawings, shall be interpreted as illustrative only and not in a limiting sense.

I claim as my invention:

1. A panel board consisting of a back plate, a plurality of bus-bars having their contact surfaces arranged in different planes above the base plate, a switch having a plurality of switch blades adapted to contact with said contact surfaces, one of said blades being shiftable to contact with any selected one of said bus-bars, and branch circuit contacts for said blades, said branch circuit contacts also being in different planes.

2. A panel board consisting of a back plate, a plurality of meter bus-bars and a neutral bus-bar arranged in different planes above the back plate, and a switch having a plurality of switch blades adapted to contact directly with the bus-bars, one of said switch blades being shiftable to engage any selected one of the meter bus-bars.

3. A panel board comprising a back plate, a plurality of superposed bus-bars, branch circuit contacts, and a switch to close the circuit between said bus-bars and said contacts, said switch comprising a body portion of conducting material, a switch blade movable therewith, but insulated therefrom, and a switch blade slidably secured to said body portion and electrically connected thereto.

4. A panel board comprising a back plate, a plurality of superposed bus-bars, branch circuit contacts, and a switch to close the circuit between said bus-bars and said contacts, said switch comprising a body portion of conducting material, a switch blade movable therewith, but insulated therefrom, a switch blade electrically connected to said body portion, but arranged to slide to different operative positions thereon.

5. A panel board comprising a back plate, a plurality of fixed bus-bars carried thereby, including a neutral bus-bar, branch circuit contacts, a switch adapted to close the circuit between said bus-bars and said contacts comprising a body portion, a blade carried thereby adapted to close the circuit between the neutral bus-bar and one of the branch circuit contacts, and a blade carried by said body portion adapted to close the circuit between the other branch circuit contacts and any one of the bus-bars.

6. A panel board comprising a back plate, a plurality of superposed bus-bars, branch circuit contacts, and a switch to close the circuit between said bus-bars and said contacts, said switch comprising a body portion of conducting material, a switch blade movable therewith, but insulated therefrom, a switch blade electrically connected to said body portion but arranged to slide to different operative positions thereon, and means to shift said blade.

7. A panel board comprising a back plate, a plurality of superposed bus-bars carried thereby, insulated one from the other, branch circuit contacts, means to close the circuit between one of said bars, and one of said contacts, and a selective device to close the circuit between the other of said contacts and any one of the remaining busbars.

8. A panel board comprising a back plate, a plurality of superposed bus-bars carried thereby insulated one from the other, branch circuit contacts, means to close the circuit between one of said bars and one of said contacts, a selective device to close the circuit between the other of said contacts and any one of the remaining busbars, and an indicating device to determine the position of the selective device.

9. A panel board comprising a back plate, superposed bus-bars carried thereby, including a neutral bus-bar, branch circuit contacts, means to close the circuit between the neutral bar and one of the branch circuit contacts, a vertically adjustable blade to close the circuit between any one of said bus-bars, not including the neutral bar, and the other of said branch circuit contacts.

10. A panel board comprising a back plate, superposed bus-bars carried thereby, including a neutral bus-bar, branch circuit contacts, means to close the circuit between the neutral bar and one of the branch circuit contacts, a vertically adjustable blade to close the circuit between any one of said bus-bars, not including the neutral bar, and the other of said branch circuit contacts, and an indicating device to determine the position of the vertically adjustable blade.

11. A panel board comprising a back plate, bus-bars carried thereby, including a neutral bus-bar, arranged in different planes, branch circuit contacts also arranged in different planes, means to close the circuit between the neutral bar and one of said branch circuit contacts, an adjustable device to close the circuit between the bus-bars, not including the neutral bar, and the other of said branch circuit contacts, and means to adjust said device to the plane of any one of said bus-bars.

12. A panel board comprising a back plate, bus-bars carried thereby, including a neutral bus-bar, arranged in different planes, branch circuit contacts also arranged in different planes, means to close the circuit between the neutral bar and one of said branch circuit contacts, a switch blade permanently located in the plane of the other of said branch circuit contacts, and an adjustable blade to close the circuit between said bus-bars and said permanently located blade.

13. A panel board comprising a back plate, bus-bars carried thereby, including a neutral bus-bar, arranged in different planes, branch circuit contacts also arranged in different planes, means to close the circuit between the neutral bar and one of said branch circuit contacts, a switch blade permanently located in the plane of the other of said branch circuit contacts, and means to close the circuit between said permanently located blade and any one of said bus-bars.

14. In a meter panel board, a plurality of meter contacts arranged side by side, another contact adapted for carrying the opposite side of the circuit, a switch having two blades movable when the switch is operated one to engage said last contact and the other to engage one of the meter contacts, and said second mentioned blade being shiftable to engage any selected one of the meter contacts.

15. A meter board comprising a back plate, a plurality of meter bus-bars superposed one above the other in different planes above the back plate, a neutral bus-bar substantially in line with the meter bus-bars, a switch adjacent said bus-bars and having a pair of blades one for the neutral bus-bar and the other for the meter bus-bars, said blades being connected for simultaneous movement into engagement with their respective bus-bars, and means whereby the last mentioned switch blade is shiftable for engaging any selected one of the meter bus-bars.

16. In a meter board, a series of meter contacts for carrying one side of the circuit, a further contact for carrying the opposite side of the circuit, a pair of branch line contacts, and a switch interposed between the branch line contacts and said first and second mentioned contacts, the switch comprising means for closing circuit between one of the branch line contacts and any selected one of the first mentioned contacts, and the switch also comprising means for closing circuit between the remaining branch line contact and the second mentioned contact.

Signed at New York city, New York, this 17th day of December, 1912.

.HUBERT F. KRANTZ.

Witnesses:
FRED FRANCIS WEISS,
MABEL DITTENHOEFER.